United States Patent [19]
Denk et al.

[11] Patent Number: 5,292,284
[45] Date of Patent: Mar. 8, 1994

[54] RELUCTANCE TORQUE COUPLER

[75] Inventors: Joseph Denk, Manhattan Beach; Edmund G. Koltz, Los Angeles; Henry Rodriguez, Maywood; Frederick B. McCarty, San Pedro, all of Calif.

[73] Assignee: Alliedsignal Inc., Morris Township, Morris County, N.J.

[21] Appl. No.: 768,130

[22] Filed: Sep. 27, 1991

Related U.S. Application Data

[63] Continuation-in-part of Ser. No. 345,312, Apr. 29, 1989, abandoned, and a continuation-in-part of Ser. No. 386,830, Jul. 27, 1989, abandoned.

[51] Int. Cl.⁵ ............................................ F16D 27/00
[52] U.S. Cl. ......................................... 464/29; 417/420; 310/104; 310/156; 310/256
[58] Field of Search .................. 310/104, 156, 256; 417/420; 464/29

[56] References Cited

U.S. PATENT DOCUMENTS

| Re. 26,094 | 10/1966 | Zimmermann | 310/104 |
|---|---|---|---|
| 2,603,678 | 7/1952 | Helmer . | |
| 3,235,759 | 2/1966 | Bowie . | |
| 3,238,883 | 3/1966 | Martin | 310/104 X |
| 3,394,278 | 7/1968 | Schetinin | 310/105 |
| 3,443,135 | 5/1969 | Lombard . | |
| 3,458,122 | 7/1969 | Andriussi et al. | 464/29 X |
| 3,520,642 | 7/1970 | Fulton | 417/420 |
| 3,591,818 | 7/1971 | Fulton | 310/104 |
| 3,689,787 | 9/1972 | Saretzky | 310/266 |
| 3,700,941 | 10/1972 | Duncan . | |
| 3,890,515 | 6/1975 | Fehr et al. | 310/104 |
| 3,932,068 | 1/1976 | Zimmermann . | |
| 3,932,069 | 1/1976 | Giardini et al. | 417/420 |
| 3,938,914 | 2/1976 | Zimmermann | 310/104 X |
| 4,013,384 | 3/1977 | Oikawa | 417/420 X |
| 4,115,040 | 9/1978 | Knorr | 464/29 |
| 4,152,099 | 5/1979 | Bingler | 310/104 |
| 4,381,466 | 4/1983 | Laenens | 310/103 |
| 4,412,146 | 10/1983 | Futterer et al. | 310/266 |
| 4,742,258 | 5/1988 | Earle et al. | 310/156 |
| 4,748,359 | 5/1988 | Yahara et al. | 310/156 |
| 4,896,064 | 1/1990 | Taiani | 310/104 |

FOREIGN PATENT DOCUMENTS

| 663089 | 10/1965 | Belgium . | |
|---|---|---|---|
| 2274830 | 6/1974 | France . | |
| 854896 | 11/1960 | United Kingdom | 464/29 |

OTHER PUBLICATIONS

*Elements of Materials Science and Engineering*, fifth edition, Van Vlach, Lawrence H., Addison-Wesley Publishing Co., 1985, pp. 337–340, 344–346.

*Primary Examiner*—Lenard A. Footland
*Attorney, Agent, or Firm*—Joseph R. Black; Robert A. Walsh

[57] ABSTRACT

A reluctance torque coupler includes a first rotor assembly which provides a magnetic field and a second rotor assembly which rotates relative to the first rotor assembly. The second rotor assembly includes a pair of elongated, arcuate flux poles that are attached to a nonmagnetic frame. The flux poles extend towards the first rotor such that they are magnetically coupled to the first rotor. Air gaps between ends define a position of minimum reluctance for the first rotor. When the conductors magnetic axis of the first rotor is aligned with the spaces, the leakage of flux across the spaces is at a minimum. If one rotor is rotated, there is a change in energy stored in the magnetic circuit. This change is resisted by a restoring torque toward the aligned position. In this manner, the torque coupler transmits torque from one rotor to another. The second rotor can be provided with a pair of relatively movable concentric members which allow for adjustment of the spaces, thereby allowing for the adjustment of the pull-out torque of the torque coupler.

20 Claims, 3 Drawing Sheets

RELUCTANCE TORQUE COUPLER

CROSS-REFERENCE TO RELATED APPLICATIONS

This application is a continuation-in-part of U.S. Ser. Nos. 07/345,312 filed on Apr. 29, 1989 and 07/386,830 filed on Jul. 27, 1989. Both parent applications have been abandoned.

FIELD OF THE INVENTION

This invention relates in general to reluctance torque couplers and in particular to such a coupler whose spaces between flux poles define a minimum reluctance position.

BACKGROUND OF THE INVENTION

A conventional synchronous torque coupler transmits rotational torque from one shaft to another. Such a coupler includes two rotors which are coupled to respective shafts. Permanent magnets are attached to each of the rotors. The torque coupler relies upon the tendency of opposite poles of permanent magnets on the two rotors to align to a position of minimum reluctance. For examples of conventional torque couplers, see U.S. Pat. Nos. 4,013,384 and 4,115,040. See also U.S. Pat. No. 3,890,515 (an excitation winding magnetizes salient ferromagnetic polar projections on the two rotors, which causes polar projections to align in a minimum reluctance magnetic circuit). For conventional synchronous torque couplers, the maximum change in magnetic circuit reluctance that can be realized is proportional to the height of the poles as compared to the non-pole space between the poles. The minimum obtainable reluctance is limited by the unity permeability of the space occupied by the non-poles.

When one rotor is rotated (the "driving" rotor) by external means such as a motor, the other rotor (the "driven" rotor) follows. In a synchronous reluctance coupling, a precise angular displacement is maintained between the two magnetically coupled rotors, with the driving rotor leading the driven rotor in phase by a few degrees. This angular displacement, or phase angle, between the two rotors is dependant upon the torque and the field, but it is independent of the speed of the rotors. Synchronism between the rotors is maintained up to a precisely discernible phase angle at which a maximum or pullout torque occurs. Above this angle, synchronism is lost. Between zero and the pullout angle, the phase angle increases with the applied torque, but is inversely proportional to the magnetic field. For any given steady-state torque, not exceeding the pullout angle, there is no energy expenditure in the rotors, mechanical losses due to windage and bearing friction excepted. Once synchronism is lost, a pulsating torque with an average value of zero is developed.

The loss of synchronism within a torque coupling device having permanent magnets in both the outer and inner rotors causes demagnetization of the permanent magnets, resulting in failure of the device. Similarly, a torque coupling device utilizing magnetic fields generated by electrical windings will be subject to excessive back EMF within the windings, leading to winding burnout and failure.

A distinction should be noted between synchronous reluctance coupling devices and coupling devices based upon either the hysteresis principle or the induction principle. These other coupling devices develop torque as a consequence of energy losses, e.g., heating, in one of the rotors. The torque is proportional to the quotient of the rotor loss divided by the slip speed. The induction, or eddy current coupling device cannot develop torque when the rotors are running synchronously. The hysteresis coupling device can develop a reduced torque at synchronism; however, the precise phase relationship between the rotors is indeterminate, depending on the previous torque history of the device.

SUMMARY OF THE INVENTION

The present invention relates to an improved high speed reluctance-type torque coupler for transmitting rotational torque between first and second rotors. The reluctance torque coupler comprises magnet means for generating a magnetic field, and at least two, arcuate flux conductors whose opposing ends define narrow spaces. The flux conductors are magnetically coupled to the magnet means.

The second rotor means can be provided with a pair of relatively movable concentric members which allow for adjustment of the spaces, thereby allowing for the adjustment of the pull-out torque of the torque coupler. The torque spring rate and maximum pullout torque can be adjusted to a smaller value by changing the relative angular positions of the two relatively movable members of the second rotor means. This changes the geometric configuration of the two flux poles. Thereby, the reluctance of the magnetic circuit of the torque coupler is changed, altering the torque spring rate and pullout torque.

DETAILED DESCRIPTION OF THE PREFERRED EMBODIMENT

Figure 1:
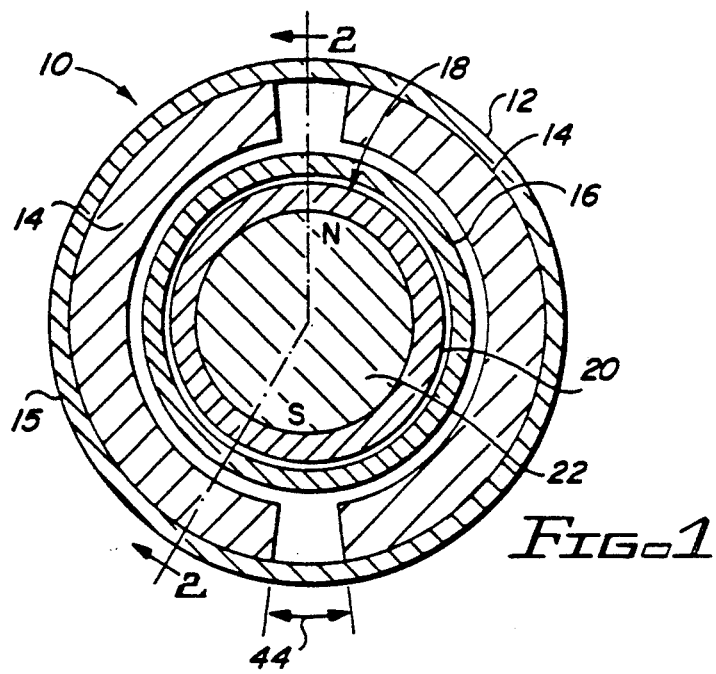
FIG. 1 is a cross-sectional view of a reluctance torque coupler according to the present invention.
Figure 2:
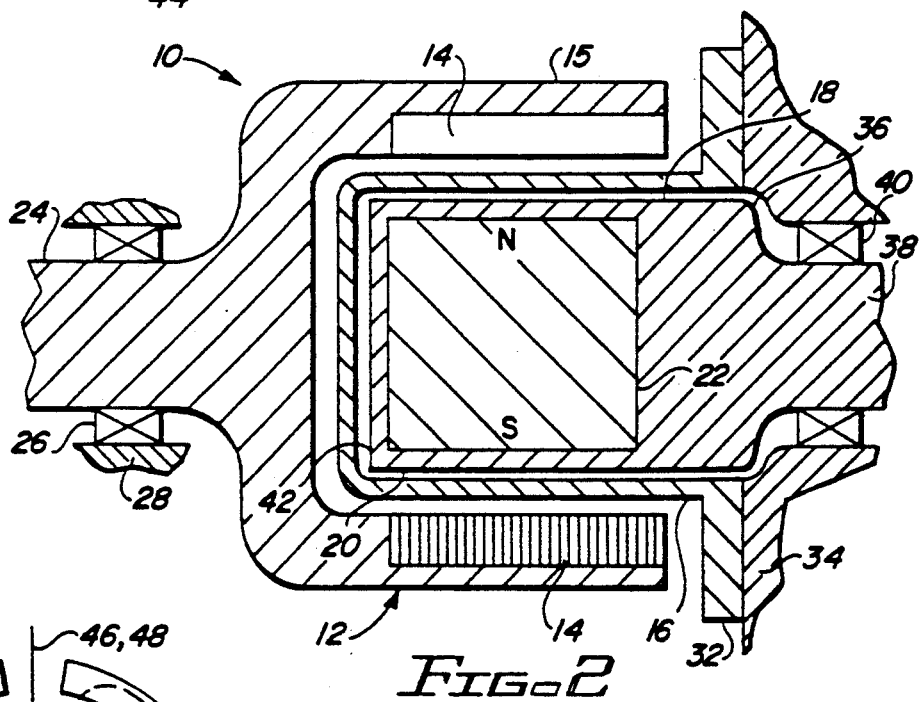
FIG. 2 is a cross sectional view, taken along sectional line 2—2, of the torque coupler shown in FIG. 1.

Referring to FIGS. 1 and 2, a torque coupler 10 includes an outer rotor assembly 12 having a pair of high-strength ferromagnetic flux conductors 14 that are Hot Isostatic Press (HIP) bonded or brazed to a high-strength, non-magnetic frame 15. This construction allows the outer rotor assembly 12 to operate at high speeds. The frame 15 is a generally cup-shaped cantilevered projection attached to a shaft 24. The outer rotor assembly 12 is disposed about an inner rotor assembly 18 forming an air gap therebetween. Supported by a bearing 26 mounted within a housing member 28, the shaft 24 can be connected to external machinery (not shown).

A non-magnetic bore seal 16 is disposed within the hollow of outer rotor assembly 12. Bore seal 16 is also generally cup shaped, and is sized for non-contacting fit within outer rotor assembly 12. In addition, bore seal 16 includes a flange 32 extending radially outward from the edge of its cup shaped portion, flange 32 allowing attachment to another housing member 34. Bore seal 16 is preferably made from a non-metallic material. Additionally, a non reactive, impermeable material may be required for the bore seal 16 in order to segregate highly reactive environments. For these types of applications, the material for bore seal 16 may be selected from the group including glass, ceramics, and plastics.

The inner rotor assembly 18 includes a high-strength, non-magnetic retaining sleeve 20 enclosing a cylindrical, diametrically magnetized, two pole permanent magnet 22. The sleeve 20 of the inner rotor assembly 18 is attached to a stub end 36 of a shaft 38. The stub end 36 is cantilevered from the end of shaft 38. Shaft 38 is supported by bearings 40 within housing member 34. Thus, stub end 36 projects into the cup shaped portions of bore seal 16, and outer rotor assembly 12. Inner rotor assembly 18 also includes an end disk 42, which covers the end of magnet 22, and attaches to the end of retaining sleeve 20 at the end of stub end 36.

The flux conductors 14 have a generally half-circular shape in cross section, and are contained within the cup shaped portion of the frame 15 so as to be facing one another. Within the outer rotor assembly 12, the flux conductors 14 extend a majority of the arcuate distance between opposite magnetic poles of magnet 22. Additionally, facing edges of the flux conductors 14 define narrow spaces 44 filled with air. The widths of the spaces 44 are one of the factors which determine the maximum torque coupling force for the torque coupler 10, and may be designed to be in the range of from slightly greater then 0 degrees up to 30 degrees in arcuate width. Preferably the spaces 44 have an arcuate width of between 0.1 and 10 degrees. Thus, each of the flux poles 14 may have an arcuate width of from 150 degrees to almost 180 degrees, and preferably, from about 170 degrees to 179.9 degrees.

Figure 3:
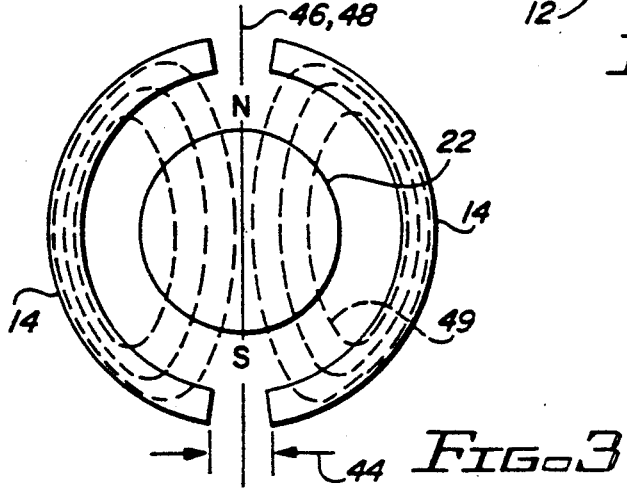
FIGS. 3, 4 and 5 depict flux plots of the magnet and the two flux conductors wherein the magnet is rotated from the preferred orientation by zero, forty five and ninety degrees, respectively.
Figure 4:
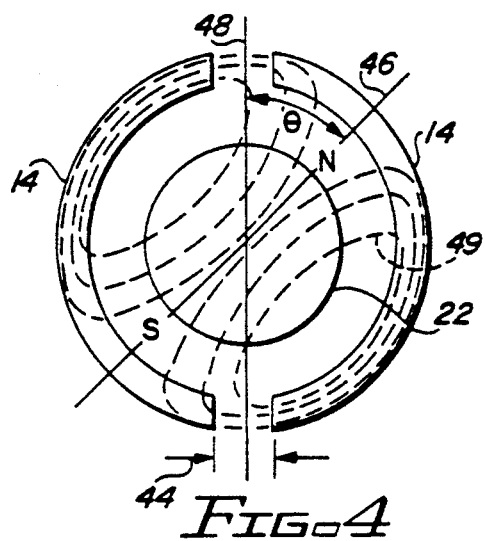
Figure 5:
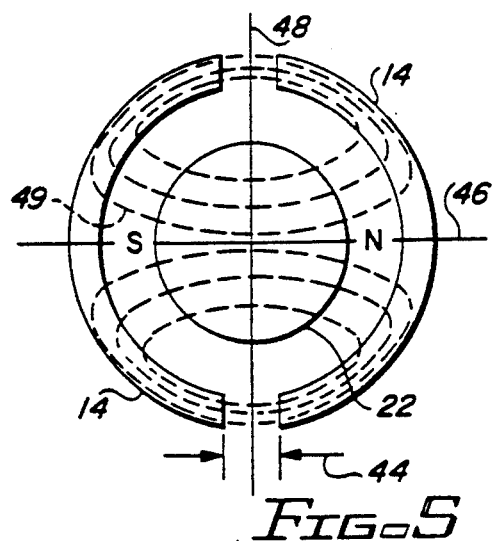

The operation of the torque coupler 10 is most readily understood with reference to FIGS. 3-5, wherein the non-magnetic support members have been removed, and only the permanent magnet 22, and the two flux conductors 14, remain. The magnetic flux surrounding the magnet 22 is depicted by magnetic flux lines 49. The flux conductors 14 act as a magnetically easy flow path for the flux, compressing the magnetic field surrounding the magnet 22. Magnetic flux exits one pole of the magnet 22, flows out and penetrates the flux conductors 14, travels along the flux conductors 14 around the magnet 22 to the opposite magnetic pole, thereupon reentering the magnet 22. It must be emphasized that the magnet 22 is surrounded by the flux conductors 14. This arrangement ensures that most of the magnetic flux lines 49 from the magnet 22 flow through the flux conductors 14, thereby making more efficient use of the flux. If, by contrast, the magnet 22 had surrounded the flux conductors, only part of the magnetic flux lines 49 would flow through the flux conductors. The remaining flux lines 49 would flow outside the torque coupler.

The spaces 44 define a position of minimum reluctance for the magnet 22. When the magnetic axis 46 of the inner rotor assembly 18 is aligned with a centerline 48 of the spaces 44, as shown in FIG. 3, the leakage of flux across the spaces 44 is at a minimum. This is a stable zero torque location.

However, when the shaft of one rotor assembly 12 or 18 is rotated such that a magnetic axis 46 of magnet 22 is angularly displaced from the centerline 48 of the spaces 44, there will be a distortion of the magnetic field and leakage across the ends of the flux conductors 14. Resulting is a change in reluctance of the magnetic circuit. This change is resisted, causing the torque coupler 10 to develop torque between the outer and inner rotor assemblies 12, 18. Resulting is a restoring torque toward the initial position where the axes 46 and 48 were aligned. The torque increases to a maximum value when the inner rotor 18 is rotated approximately 45 degrees from the space centerline 48 of outer rotor assembly 12. The torque then decreases, reaching an unstable zero level at 90 degrees of relative rotation.

FIG. 4 shows the effect on the magnetic field which results from rotating magnet 22 approximately 45 degrees with respect to the space centerline 48. In this orientation, a significant amount of the magnetic flux is forced to leak across the spaces 44 between the ends of flux conductors 14. Additionally, the flux passing through the magnet 22 has been decreased due to the increase in the magnetic circuit reluctance. This change in flux is resisted by the magnet 22, and requires work input into the torque coupler 10.

FIG. 5 shows the unstable zero torque position where the magnet 22 has been rotated exactly 90 degrees from the space centerline 48. In this orientation, all of the decreased magnetic flux is forced to leak across the spaces 44, and the relative attraction to realignment of the magnetic axis 46 with the centerline 48 is equalized in the clockwise and counter clockwise directions. Thus, zero torque is exerted upon the magnet 22 and flux conductors 14. When the orientation of the magnetic axis deviates from the 90 degree position, the magnet 22 will then prefer to continue rotation in the same direction in order to realign with the space centerline 48.

Figure 6:
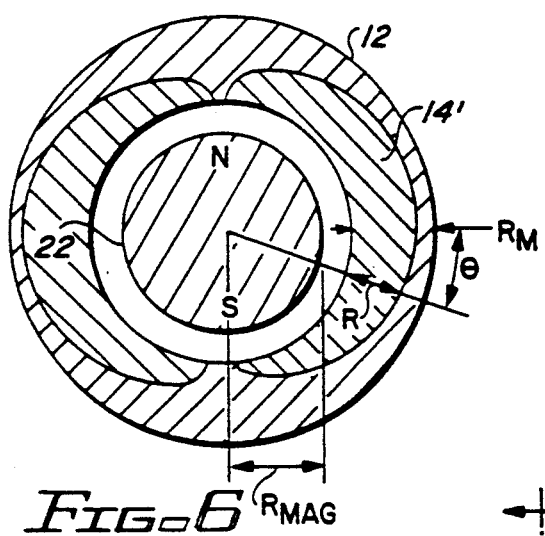
FIG. 6 depicts an optimized design for the outer rotor assembly of FIG. 1.

FIG. 6 shows a preferred configuration for the flux conductors 14 of the outer rotor assembly 12, wherein the design of the flux conductors 14 is optimized. For flux poles 14' formed of a ferromagnetic material with any given properties, maximum torque will be realized from a magnet of any given diameter and length when the maximum radial thickness (Rm) of each flux pole 14' is determined by the equation:

$$Rm = Rmag*(Bmag/Bpole)$$

and the radial thickness (R) of the flux poles 14 varies according to the equation:

$$R = Rm* \cos(THETA)$$

where: Rmag is the radius of the magnet 22; Bmag is the flux density in the magnet at the minimum reluctance position; Bpole is the optimum maximum density in flux conductor iron at the minimum reluctance position, (about 90 KL/sq. in. for silicon steel); and THETA is the angular displacement from Rm. Thus it may be appreciated that the optimum cross section for the flux poles 14 is generally a crescent shape.

Furthermore, the torque developed in a reluctance coupling is given by the differential equation:

$$T = d(E)/d(THETA) * K$$

wherein E is the magnetic co-energy of the system; THETA is the angular displacement of the outer and inner rotor assemblies 12, 18; and K is a constant. The maximum rate of change in the magnetic co-energy d(E)/d (THETA) for an ideal coupling is a function of the total change in magnet flux linkage for a 0 to 90 degree displacement and of zero pole leakage. In practice, the ideal is not realizable due to the flux leakage existing between the flux conductors 14'. Although leakage can be reduced by reducing flux pole dimension Rm, the higher saturation which occurs at the minimum reluctance position is counter productive.

It may be appreciated that at the minimum reluctance position and with negligible iron saturation, flux density in the magnet remains uniform regardless of the width of radial air gap between outer and inner rotor assemblies 12, 18 and that the magnetic flux density in the air gap varies sinusoidally, being maximum in the direction of magnetization of the magnet 22. Thus, the flux conductors 14' are preferably designed to the cosine rule (as previously defined) in order to obtain minimum leakage and most economical use of materials.

FIGS. 7-11 depict alternate embodiments of a torque coupler according to the present invention. Reference numerals of elements shown in FIG. 7 that correspond to elements of FIGS. 1-5 have been increased by one hundred. Similarly, reference numerals of elements shown in FIG. 8-11 that correspond to elements of FIGS. 1-5 have been increased by two hundred. Unless stated otherwise, the torque couplers shown in FIGS. 7 and 8-11 operate in the same manner as the torque coupler shown in FIGS. 1-5.

Figure 7:
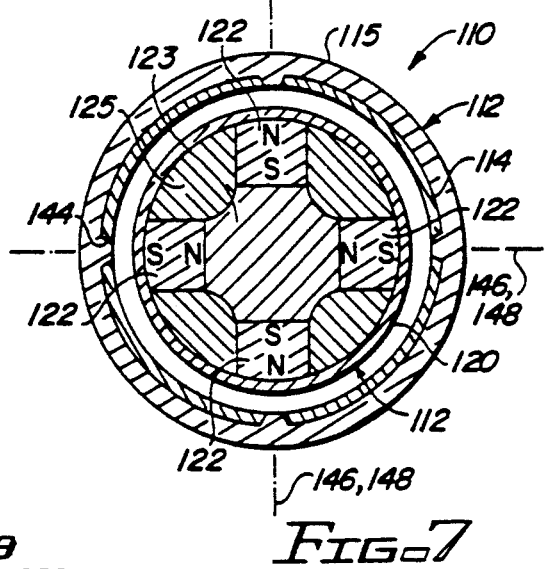
FIG. 7 is a cross-sectional view of an alternate embodiment of a multiple-pole torque coupler according to the present invention.

Referring now to the embodiment of FIG. 7, a multipole torque coupler 110 has an outer rotor 112 including a plurality of flux conductors 114 contained within a non-magnetic carrier 115. The multi-pole torque coupler 110 also includes an inner rotor 118, having a plurality of magnets 122 mounted about a cross-shaped permeable core 123. Inner rotor 118 also includes a plurality of spacers 125 which separate the plurality of magnets 122. The magnets 122, permeable core 123, and spacers 125 are all contained within a retaining hoop 120 of high strength non-magnetic material.

The magnetic axes 146 of each of the magnets 122 tend to align with the centerlines 148 of the spaces 144 between ends of flux conductors 114. The magnets 122 are arranged such that every magnet 122 has an opposite magnetic pole facing outward from that of the closest magnets on either side thereof. Thus, magnetic flux emanating from an outwardly facing north pole flows into proximate flux conductors 114, along the flux poles 114 to the opposite ends thereof, and into the outwardly facing south poles of the two closest magnets 122. The magnetic circuit is completed by the permeable core 123 which provides a magnetically easy flow path between the inwardly facing poles of the magnets 122. Deviation from alignment of the magnetic axes 146 from the centerlines 148 of the gaps 144 between flux conductors 114 causes a change in the magnetic circuit, and consequently requires work input.

Figure 8:
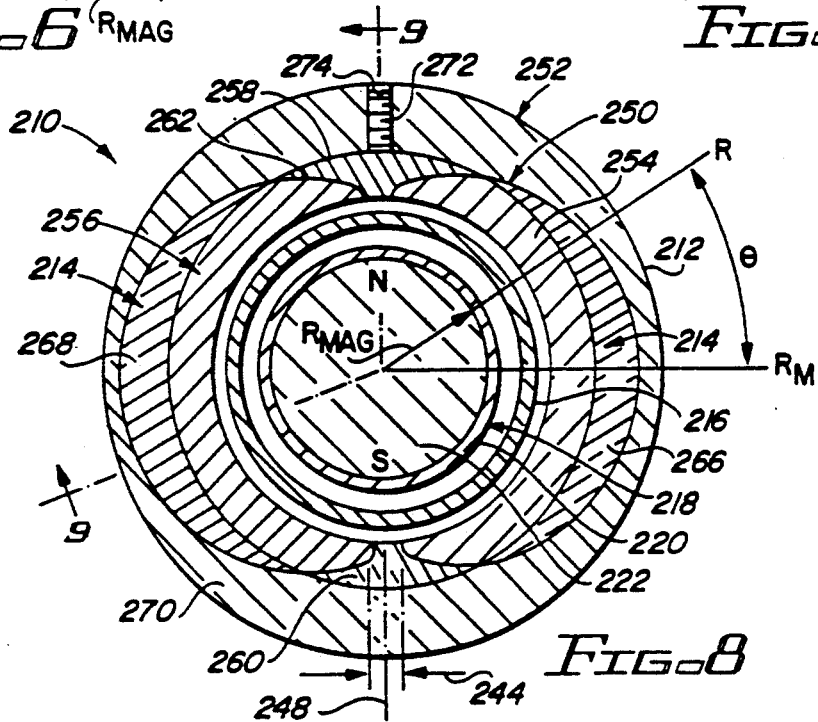
FIG. 8 is a cross-sectional view of yet another embodiment of the torque coupler according the present invention.
Figure 9:
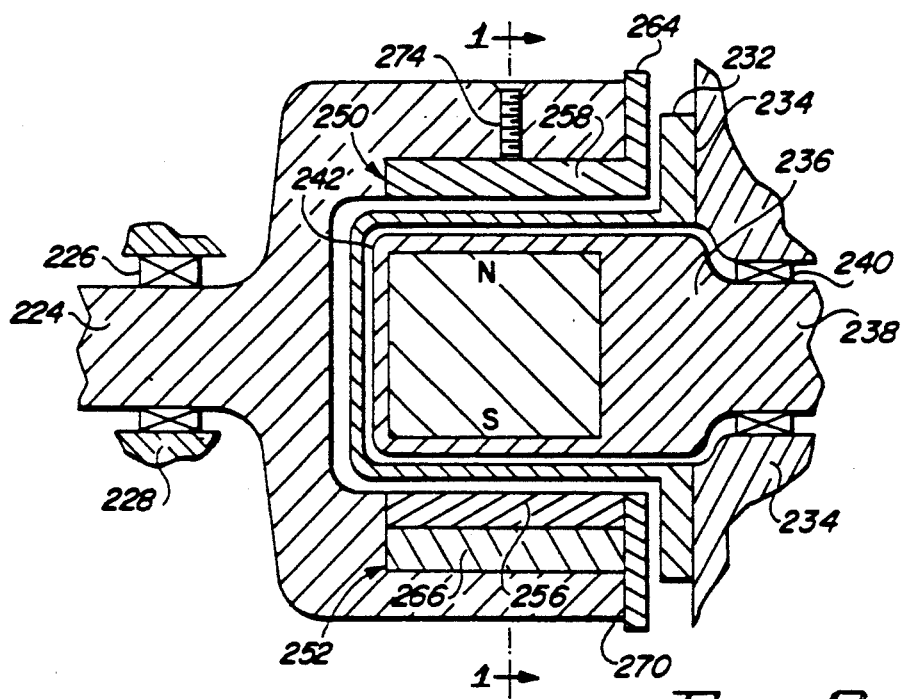
FIG. 9 is a cross sectional view, taken along sectional line 9—9, of the torque coupler shown in FIG. 8.

Referring now to the torque coupler 210 of FIGS. 8 and 9, the outer rotor assembly 212 is made up of two relatively movable cylindrical members 250, 252. Member 250 is mounted within member 252, with close dimensional tolerances between the outer diameter of member 250 and the inner diameter of member 252. Member 250 includes two primary flux conductor sections 254 and 256, in spaced apart, facing relationship to one another. The primary flux conductor sections 254 and 256 are ferromagnetic, and are preferably formed from silicon steel. Additionally, the primary flux conductor sections 254 and 256 are preferably partial-crescent in cross sectional shape. Member 250 also includes a non-magnetic support element 258 having spacers 260, 262 filling the space 244 between the ends of the primary flux conductor sections 254, 256, and a flange 264 attached to the spacers 260, 262. Flange 264 allows an easy method of angularly turning the member 250 relative to member 252, which may be accomplished by hand turning for example.

Member 252 includes oppositely disposed secondary flux conductor sections 266 and 268, contained within a non-magnetic high strength support sleeve 270. The support sleeve 270 is designed to contain the secondary flux pole sections 266 and 268, as well as the member 250 during high speed operation of the torque coupler 210. The support sleeve 270 is integrally attached to, or forms a part of, shaft 224. Also, a threaded bore 272 extending through the support sleeve 270 accommodates a positioning screw 274 which may be moved into, or out of contact with the member 250 to fix, or allow relative rotation of the two members 250, 252. The secondary flux pole sections 266, 268 of member 252 are configured to cooperate with the primary flux conductor sections 254, 256 of member 250 to provide a magnetically easy flux return path for magnetic flux generated by the magnet 222 of the inner rotor 218. Secondary flux conductor sections 266, 268 are preferably crescent shaped in cross section, thereby when aligned in the maximum pull-out torque configuration, the flux conductors 214 which are made up of paired primary and secondary flux conductor sections from members 250 and 252, are generally crescent shaped.

Figure 10:
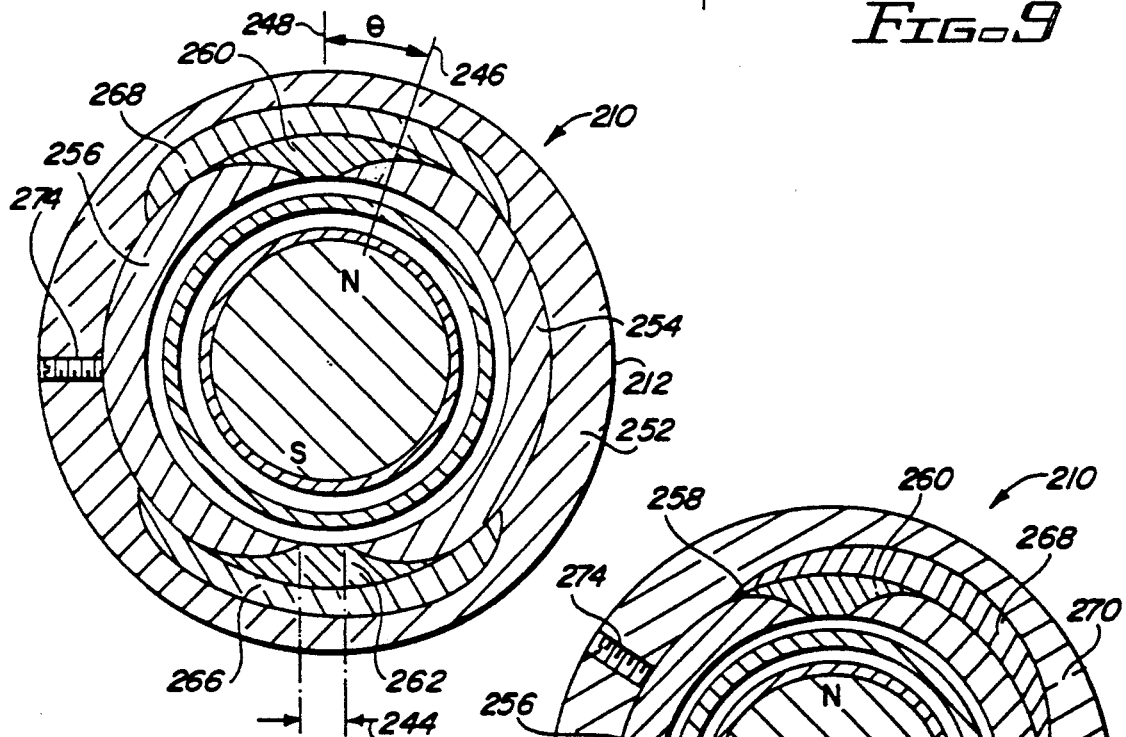
FIG. 10 is a cross-sectional view similar to FIG. 8 except that the outer rotor assembly is in a minimum pullout torque configuration.

In FIG. 10, the outer rotor assembly 212 is configured in the minimum pull out torque configuration. Here, members 250 and 252 have been rotated 90 degrees to one another and fixed in location by positioning screw 274. In this configuration, the secondary flux conductor sections 266 and 268 span the spaces 244 between the primary flux conductor sections 254 and 256. The secondary flux conductor sections 266, 268 provide an easy magnetic flux path bridging the two primary flux conductor sections 254, 256. A magnetic return circuit is thereby provided which flows around the magnet 222 within the outer rotor assembly 212 within a magnetically easy, although circuitous magnetic circuit.

In this configuration of the outer rotor assembly 212, the magnetic axis 246 of magnet 222 will still preferably align with the space centerline 248 between the two primary flux conductor sections 254, 256. However, the resistance to change from this position, and the maximum torque developed between the inner rotor assembly 218 and outer rotor assembly 212 is significantly reduced, and depending upon specific geometries of the flux conductor sections 266, 268, the torque may approach zero. This position thus defines the minimum spring rate and pull out torque configuration for the torque coupler 210.

Figure 11:
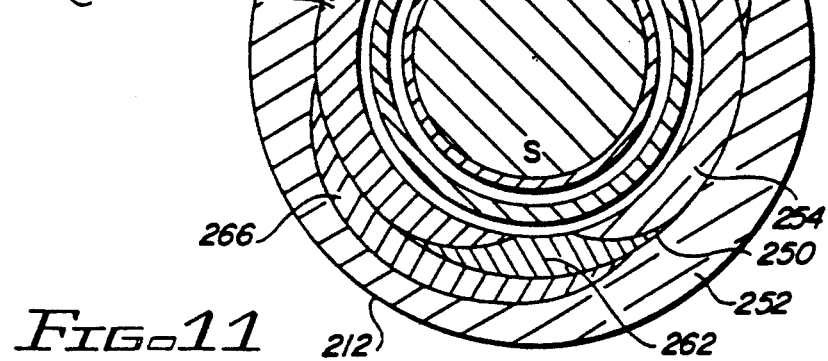
FIG. 11 is a cross-sectional view similar to FIG. 8 except that the outer rotor assembly is in an intermediate pullout torque configuration.

In FIG. 11, the members 250 and 252 of the outer rotor assembly 212 are relatively positioned intermediate the maximum and minimum pull out torque configurations of FIGS. 8 and 10. By providing for a method of adjusting the maximum pull out torque for the torque coupler 210, the torque coupler 210 can be readily adapted to specific applications. In this arrangement, the magnetic reluctance between the respective flux conductors 214 has been reduced as compared to FIG. 8, and the magnetic circuit within the outer rotor assembly 212 has been altered, thereby reducing the maximum pull out torque and changing the torque spring rate of the torque coupler 210.

By varying the relative geometric sizes and thicknesses of the primary flux conductor sections 254, 256 and secondary flux conductors sections 266, 268, another method of specifically tailoring the ability to change the maximum pull out torque and torque spring rate for the torque coupler 210 is provided. Thus, by providing secondary flux conductor sections 266, 268 which are relatively thin in cross section compared to the primary flux conductor sections 254, 256, very fine tuning within a narrow range for the maximum pull out torque is provided. Conversely, where the secondary flux pole sections 266, 268 have a thickness approximately equal to the primary flux conductor sections 254, 256 large variations of the maximum pull out torque can be accomplished.

In order to reduce flux leakage between flux conductors 14 to a minimum or negligible value, the spacers 260, 262 of support element 258 may be formed from either normal conductor material or diamagnetic superconductive material. When normal conductive material is used, the ideal maximum torque can be approached, but only momentarily while the induced damping current exists. This will help stabilize the outer and inner rotor assemblies 212, 218 during load pulsations. Superconductive spacers 260, 262 will reduce flux leakage to zero, whereby the ideal maximum torque for any particular torque coupler 210 can be achieved. It should be noted that when the flux dampers 252 are included within the design of the outer rotor 212, the angle at which the maximum torque is achieved will shift from the 45 degree position.

It should be evident from the foregoing description that the present invention provides many advantages over torque couplers of the prior art. Although preferred embodiments are specifically illustrated and described herein, it will be appreciated that many modifications and variations of the present invention are possible in light of the above teaching to those skilled in the art. Therefore, the invention is not limited by the specific examples herein, but only by the proper scope of the appended claims.

We claim:

1. A reluctance torque coupler comprising:
   magnetic source means for providing magnetic flux having at least one magnetic axis;
   first rotor means for allowing said at least one magnetic axis to be rotated about a rotational axis;
   at least two elongated, arcuate, ferromagnetic flux conductors whose opposing ends define narrow spaces, said conductors functioning to conduct at least some of said flux provided by said magnetic source means, said flux conductors having a higher magnetic permeability than said spaces; and
   second rotor means, to which said flux conductors are secured, for allowing said flux conductors to be rotated about said rotational axis, whereby said coupler is in a minimum reluctance position when at least one magnetic axis is aligned with said spaces.

2. A torque coupler according to claim 1, wherein said narrow spaces have an arcuate width ranging between 0.1 degrees and 10 degrees.

3. A torque coupler according to claim 1, wherein said magnetic source means includes a two pole permanent magnet.

4. A torque coupler according to claim 3, wherein two flux conductors extend a majority of the arcuate distance between opposite magnetic poles of said magnet, whereby said flux conductors surround a substantial portion of said magnet.

5. A torque coupler according to claim 4, wherein said magnet is a cylindrical magnet that is magnetized diametrically, and wherein said flux conductors extend through an arcuate length of between 150 degrees and almost 180 degrees.

6. A torque coupler according to claim 5, wherein said flux conductors extend through an arcuate length between 170 degrees and 179.5 degrees.

7. A torque coupler according to claim 6, wherein said flux conductors have a crescent shape in cross section.

8. A torque coupler according to claim 7, wherein the maximum width of said crescent shape is equal to the product of the radius of the magnet multiplied by the ratio of the flux density in the magnet at minimum reluctance divided by the optimum maximum flux density in the flux conductors.

9. A torque coupler according to claim 8, wherein the radial thickness of the crescent-shaped flux conductors is equal to said maximum width multiplied by the cosine of the angular displacement from the location of said maximum width.

10. A torque coupler according to claim 1, wherein said second rotor means is disposed about said first rotor means, whereby said flux conductors extend radially towards said magnetic source means.

11. A torque coupler according to claim 10, further including flux shield means for preventing magnetic flux leakage between said ends of said flux conductors, said spaces between said flux conductors being at least partially filled by said flux shield means.

12. A torque coupling according to claim 11, wherein said flux shield means is made of a diamagnetic superconductor.

13. A torque coupler according to claim 10, further comprising bore seal means disposed between said magnetic source means and said flux conductors for segregating the environments of said first rotor means from said second rotor means.

14. A torque coupler according to claim 10, further comprising movable adjusting means for selectively adjusting the geometry of said flux conductors, whereby the reluctance within the circuit of said flux conductors can be adjusted to provide an adjustable maximum pull-out torque.

15. A torque coupler according to claim 14, wherein said flux conductors are primary flux conductors, and wherein said adjusting means includes at least one pair of secondary flux conductors of ferromagnetic material, said secondary flux conductors being coupled to said second rotor means for rotation relative to said primary flux conductors, said secondary flux conductors being rotated to adjust the geometry of said primary flux conductors.

16. A torque coupler according to claim 15, wherein said second rotor means has a cylindrical shape, and wherein said adjusting means further includes a non-magnetic hollow cylinder that is disposed about said second rotor means and mounted for rotation about said rotational axis, said at least one pair of secondary flux conductors being mounted to said cylinder to cooperate with said primary flux conductors.

17. A torque coupler according to claim 16, wherein said secondary flux conductors are generally crescent shaped.

18. A torque coupler according to claim 17, wherein said secondary flux poles traverse a minority of the distance between opposite magnetic flux poles within the magnetic field generated by said inner rotor means.

19. A torque coupler according to claim 1, wherein said narrow spaces are occupied by air.

20. A reluctance torque coupler for transmitting torque between first and second shafts, comprising:

an inner rotor for generating a high strength magnetic field, including a solid cylindrical diametrically magnetized high strength magnet, a retaining sleeve of high strength, non-metallic material mounted about said magnet, one end of said retaining sleeve being secured for rotation to said first shaft, and non-magnetic end plate means, attached to an opposite end of said retaining sleeve, for covering and containing said magnet within said retaining sleeve; and an outer rotor for providing at least one pair of isolated, magnetically easy flux paths for said magnetic field and for changing the magnetic circuit energy and flux within said magnet of said inner rotor with relative rotation of said outer rotor with respect to said inner rotor, said outer rotor including a non-magnetic frame disposed about said inner rotor and secured for rotation with said second shaft, and a plurality of ferromagnetic flux conductors for providing said easy flux paths, said flux conductors being mounted to said frame to extend radially towards said inner rotor means, said flux conductors spanning a majority of the arcuate distance between opposite magnetic poles of said magnet, said flux poles being circumferentially discontinuous, whereby said flux conductors define spaces.

* * * * *